US012675764B2

(12) United States Patent (10) Patent No.: US 12,675,764 B2
Otsuki et al. (45) Date of Patent: Jul. 7, 2026

(54) DELIVERY SYSTEM, DELIVERY METHOD, AND NON-TRANSITORY COMPUTER-READABLE STORAGE MEDIUM

(71) Applicant: TOYOTA JIDOSHA KABUSHIKI KAISHA, Toyota (JP)

(72) Inventors: Nobuhisa Otsuki, Toyota (JP); Haeyeon Lee, Tokyo-to (JP); Yutaro Takagi, Tokyo-to (JP); Yuta Itozawa, Nagoya (JP); Hirotaka Komura, Tokyo-to (JP); Kunihiro Iwamoto, Nagakute (JP); Kota Oishi, Yokohama (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 7 days.

(21) Appl. No.: 17/827,337

(22) Filed: May 27, 2022

(65) Prior Publication Data

US 2023/0011955 A1 Jan. 12, 2023

(30) Foreign Application Priority Data

Jul. 12, 2021 (JP) ................................. 2021-114995

(51) Int. Cl.
*G06Q 10/083* (2024.01)
(52) U.S. Cl.
CPC .............................. *G06Q 10/08355* (2013.01)
(58) Field of Classification Search
CPC .............................................. G06Q 10/08355
See application file for complete search history.

(56) References Cited

U.S. PATENT DOCUMENTS 7,124,087 B1 * 10/2006 Rodriguez ............. G06Q 10/02
705/5
8,947,696 B1 * 2/2015 Uyttendaele .......... G06F 3/1272
358/1.15
(Continued)

FOREIGN PATENT DOCUMENTS

CN 118052498 A * 5/2024 ......... G06Q 10/0834
JP 2004-152021 A 5/2004
(Continued)

OTHER PUBLICATIONS

Hailong Huang et al., "Scheduling of a parcel delivery system consisting of an aerial drone interacting with public transportation vehicles", published by MDPI.com on Apr. 5, 2020 (Year: 2020).*

*Primary Examiner* — Omar Zeroual
(74) *Attorney, Agent, or Firm* — Oliff PLC

(57) ABSTRACT

This paper discloses a delivery system in which delivery of an object to an event is carried out by a mobile body which travels autonomously and can flexibly cope with the change without bothering a user even when a schedule for the event is changed in the middle of the delivery. The delivery system acquires the schedule of a target event to which the object is delivered from the database in which the event can be registered by the user. Then, it creates the delivery plan based on the acquired schedule. The mobile body travels according to the delivery plan. When the schedule is changed during the delivery, the delivery system modifies the delivery plan based on a changed schedule and a current position of the mobile body and moves the mobile body according to the modified delivery plan.

8 Claims, 6 Drawing Sheets

(56) References Cited

U.S. PATENT DOCUMENTS

| | | | | |
|---|---|---|---|---|
| 9,459,620 | B1* | 10/2016 | Schaffalitzky | G05D 1/0016 |
| 9,536,216 | B1* | 1/2017 | Lisso | B65B 43/00 |
| 9,959,771 | B1* | 5/2018 | Carlson | G08G 5/57 |
| 10,328,805 | B1* | 6/2019 | Wyrobek | B60L 53/00 |
| 10,553,122 | B1* | 2/2020 | Gilboa-Amir | G06Q 10/0832 |
| 11,257,023 | B1* | 2/2022 | Rafii | H04L 67/52 |
| 11,783,273 | B1* | 10/2023 | Ciliberti | G06Q 10/0833 |
| | | | | 705/332 |
| 2002/0147667 | A1* | 10/2002 | Shiba | G06Q 20/203 |
| | | | | 705/28 |
| 2004/0220845 | A1* | 11/2004 | Malapitan | G06Q 10/08 |
| 2007/0083410 | A1* | 4/2007 | Hanna | G06Q 10/0833 |
| | | | | 705/336 |
| 2015/0120094 | A1* | 4/2015 | Kimchi | B64U 50/19 |
| | | | | 701/3 |
| 2015/0161667 | A1* | 6/2015 | Stevens | G06Q 10/083 |
| | | | | 705/14.58 |
| 2016/0019657 | A1* | 1/2016 | Mande | G06Q 40/12 |
| | | | | 705/30 |
| 2016/0170991 | A1* | 6/2016 | Birchall | G06F 16/24578 |
| | | | | 707/751 |
| 2016/0189098 | A1* | 6/2016 | Beaurepaire | G06Q 10/0835 |
| | | | | 705/337 |
| 2016/0253908 | A1* | 9/2016 | Chambers | G05D 1/1064 |
| | | | | 701/2 |
| 2016/0371628 | A1* | 12/2016 | Wilkinson | G06Q 10/083 |
| 2017/0185961 | A1* | 6/2017 | Shiryan | G06Q 10/0838 |
| 2017/0286892 | A1* | 10/2017 | Studnicka | G06Q 20/3224 |
| 2017/0293881 | A1* | 10/2017 | Narkulla | G06Q 10/083 |
| 2017/0352004 | A1* | 12/2017 | McHale | G01C 21/3415 |
| 2017/0372259 | A1* | 12/2017 | Lesser | G05D 1/0038 |
| 2018/0101817 | A1* | 4/2018 | Lection | G06Q 10/0832 |
| 2018/0189728 | A1* | 7/2018 | Jones | G06Q 30/0222 |
| 2019/0028904 | A1* | 1/2019 | Carpenter | G08G 5/76 |
| 2019/0156287 | A1 | 5/2019 | Endo et al. | |
| 2019/0285424 | A1* | 9/2019 | Imai | G06Q 10/08 |
| 2019/0392371 | A1* | 12/2019 | Kline | G06Q 10/083 |
| 2020/0167722 | A1* | 5/2020 | Goldberg | G08G 5/30 |
| 2020/0219407 | A1* | 7/2020 | Priest | G08G 5/76 |
| 2020/0271461 | A1* | 8/2020 | Yamashita | G06Q 10/06315 |
| 2020/0273079 | A1* | 8/2020 | Raviv | G06Q 30/0631 |
| 2020/0310438 | A1* | 10/2020 | Suzuki | G05D 1/0212 |
| 2020/0354084 | A1* | 11/2020 | Priest | B64U 10/14 |
| 2021/0065098 | A1* | 3/2021 | Park | G06Q 10/087 |
| 2021/0065111 | A1* | 3/2021 | Smith | G06Q 10/08355 |
| 2021/0256472 | A1* | 8/2021 | Javidan | H04W 4/025 |
| 2022/0106042 | A1* | 4/2022 | Eliopoulos, II | G06Q 30/0611 |
| 2022/0391834 | A1* | 12/2022 | Otsuki | G06Q 10/0833 |
| 2022/0414811 | A1* | 12/2022 | Liotta | G05D 1/0217 |
| 2023/0206170 | A1* | 6/2023 | Neumann | G06Q 10/08355 |
| | | | | 705/338 |

FOREIGN PATENT DOCUMENTS

| | | | | |
|---|---|---|---|---|
| JP | 2018-142062 A | 9/2018 | | |
| JP | 2019-095865 A | 6/2019 | | |
| JP | 2020-522776 A | 7/2020 | | |
| JP | 2020-160708 A | 10/2020 | | |
| WO | WO-0120409 A2 * | 3/2001 | | G06Q 10/1093 |
| WO | WO-2018005663 A1 * | 1/2018 | | G06Q 10/0832 |
| WO | WO-2018150244 A1 * | 8/2018 | | G06F 16/22 |
| WO | 2018/204488 A1 | 11/2018 | | |
| WO | WO-2019023704 A1 * | 1/2019 | | G06Q 10/08 |
| WO | WO-2019091568 A1 * | 5/2019 | | G06N 20/00 |
| WO | WO-2021015663 A1 * | 1/2021 | | G01C 21/3438 |
| WO | WO-2021194611 A1 * | 9/2021 | | G08G 5/54 |
| WO | WO-2021194852 A1 * | 9/2021 | | G06Q 10/083 |

* cited by examiner

DELIVERY SYSTEM, DELIVERY METHOD, AND NON-TRANSITORY COMPUTER-READABLE STORAGE MEDIUM

CROSS-REFERENCE TO RELATED APPLICATION

The present application claims priority under 35 U.S.C. § 119 to Japanese Patent Application No. 2021-114995, filed Jul. 12, 2021, the contents of which application are incorporated herein by reference in their entirety.

BACKGROUND

Field

The present disclosure relates to a technology for delivering an object by a mobile body which travels autonomously to a designated delivery destination.

Background Art

JP2018-142062A discloses a technology relating to an object delivery process of delivering an object requested by a consignor to a consignee. According to this conventional technology, when a consignee is absent, a delivery schedule for an object to be redelivered is selected from a delivery schedule group including a delivery destination of the object and a scheduled delivery time in a delivery processing terminal possessed by a deliverer. Then, based on customer information included in the selected delivery schedule, the consignee's communication terminal is notified of redelivery information including re-deliverable time zone information. The delivery processing terminal reschedules the selected delivery schedule based on the received delivery information when it receives the redelivery information including the time zone information designated by the consignee via the consignee's communication terminal.

By the way, with regard to delivery of an object, there is a case where it is required to deliver the object accurately to a place and at time where and when the object is required. However, there is a case where a place and time to be delivered are changed suddenly depending on the contents of the object. One of the examples is coffee served at a meeting. When a meeting room where the meeting is held is changed or a meeting time is changed, a place and time where and when the coffee is served also need to be changed.

Recently, it has been considered to deliver an object by a mobile body which travels autonomously. However, as in the example of the meeting, there is a case where a schedule for an event to which an object is to be delivered is changed for reasons of the user's own, the schedule such as a venue, time, number of participants, and the like. Moreover, there is an additional case where the event schedule is changed in the middle of delivering the object.

The conventional technology disclosed by JP2018-142062A is a technology relating to redelivery after the consignee fails to receive the object. Even if this conventional technology is applied to delivery of the object to the event, it cannot cope with a sudden change in the event schedule.

Incidentally, the following JP2019-095865A and JP2020-160708A are exemplified in addition to the above JP2018-142062A as documents showing the technical level in the technical field of the present disclosure or the technical field related to it at the time of applying.

SUMMARY

The present disclosure is disclosed in view of the above-described problems. A purpose of the present disclosure is to provide a delivery system which delivers an object toward an event by a mobile body which travels autonomously, the delivery system which can flexibly cope with a change without bothering a user even when the event schedule is changed in the middle of delivering the object.

The present disclosure provides a delivery system. The delivery system of the present disclosure is a system configured to include a mobile body which delivers an object by autonomous travel and a management server connected with the mobile body by a communication network. The delivery system of the present disclosure comprises at least one memory storing at least one program and at least one processor coupled with the at least one memory. The at least one program is configured to cause the at least one processor to execute:

Acquiring a schedule from a database in which an event can be registered by a user, the schedule being for a target event to which the object is delivered:

Creating a delivery plan of the object to the event by the mobile body based on the acquired schedule:

Moving the mobile body according to the delivery plan:

Modifying the delivery plan in response to a change in the schedule for the target event during the delivery of the object based on the changed schedule and the current position of the mobile body: and Moving the mobile body in accordance with the modified delivery plan.

According to the delivery system having above-described configuration of the present disclosure, even when a schedule for a target event is changed after the mobile body has started to deliver the object, the object can be delivered in accordance with the changed schedule. In addition, when the schedule for the target event is changed, the delivery plan is modified accordingly, so that there is an advantage that the user does not need to announce the change of the delivery destination or delivery time.

In the delivery system of the present disclosure, the at least one program may be configured to cause the at least one processor to execute modifying the delivery plan to cancel delivery of the object in response to cancellation of the target event. According to this, when the target event is canceled, the delivery of the object is also canceled, so that it is possible to prevent an unnecessary object from being delivered.

In the delivery system of the present disclosure, the at least one program may be configured to cause the at least one processor to execute inquiring of the user whether to cancel delivery of the object or not in response to cancellation of the target event. According to this, the object can be delivered as it is in case where the user requires the object even when the target event is canceled.

Furthermore, in the delivery system of the present disclosure, the at least one program may be configured to cause the at least one processor to execute the following processes:

Issuing a notification to the user in response to an anticipated delay in delivery of the object toward the target event: and Modifying the delivery plan following the user's instruction to the notification.

According to the above-described processes, in case where delivery of the object cannot be made in time for the changed schedule for the target event, it is possible to prevent the object which becomes no longer useful from being delivered by notifying the user and asking for an instruction instead of delivering the object as it is.

Also, the present disclosure provides a delivery method. The delivery method of the present disclosure is a method for delivering an object by controlling a behavior of a mobile body by a computer and making the mobile body travel autonomously to a designated destination. The delivery method of the present disclosure includes the following steps:

Acquiring a schedule from a database in which an event can be registered by a user, the schedule being for a target event to which the object is delivered:

Creating a delivery plan of the object to the target event by the mobile body based on the acquired schedule:

Moving the mobile body according to the delivery plan:

Modifying the delivery plan in response to a change in the schedule for the target event during the delivery of the object based on the changed schedule for the target event and a current position of the mobile body: and Moving the mobile body in accordance with the modified delivery plan.

According to the delivery method of the present disclosure including the above steps, even when the schedule for the target event is changed after the mobile body has started to deliver the object, the object can be delivered in accordance with the changed schedule. In addition, when the schedule of the target event is changed, the delivery plan is modified accordingly, so that there is an advantage that the user does not need to announce the change in the delivery destination or delivery time.

Also, the present disclosure provides a program. The program may be recorded on a non-transitory computer-readable storage medium. The program of the present disclosure is a program that causes a computer to control a behavior of a mobile body which delivers an object to a designated delivery destination by autonomous travel. The program of the present disclosure is configured to cause the computer to execute the following:

Acquiring a schedule from a database in which an event can be registered by a user, the schedule being for a target event to which the object is delivered:

Creating a delivery plan of the object to the target event by the mobile body based on the acquired schedule:

Moving the mobile body according to the delivery plan:

Modifying the delivery plan in response to a change in the schedule for the target event during the delivery of the object based on the changed schedule and a current position of the mobile body: and Moving the mobile body in accordance with the modified delivery plan.

According to the program of the present disclosure having above-mentioned configuration, even when the schedule for the target event is changed after the mobile body has started to deliver the object, it is possible that the computer is made to control the behavior of the mobile body to deliver the object in accordance with the changed schedule. In addition, when the schedule for the target event is changed, the computer executes to modify the delivery plan accordingly, so that there is an advantage that the user does not need to announce the change in the delivery destination or delivery time.

As described above, according to the technology of the present disclosure, even when the schedule for the target event is changed in the middle of delivering the object by the mobile body, it is possible to flexibly cope with the change without bothering the user.

DETAILED DESCRIPTION

Hereinafter, embodiments of the present disclosure are described with reference to the accompanying drawings. Hereinafter, in embodiments described below, when a number like a number of a certain thing, quantity, amount, range, or the like of each element is referred to, the idea relating to the present disclosure is not limited to the number referred to, except when it is particularly clarified, or the number is clearly specified in principle. In addition, the structure and the like in the embodiments described below are not necessarily essential to the idea relating to the present disclosure, except when particularly clarified or explicitly specified in principle.

1. Configuration of Delivery System

Figure 1:
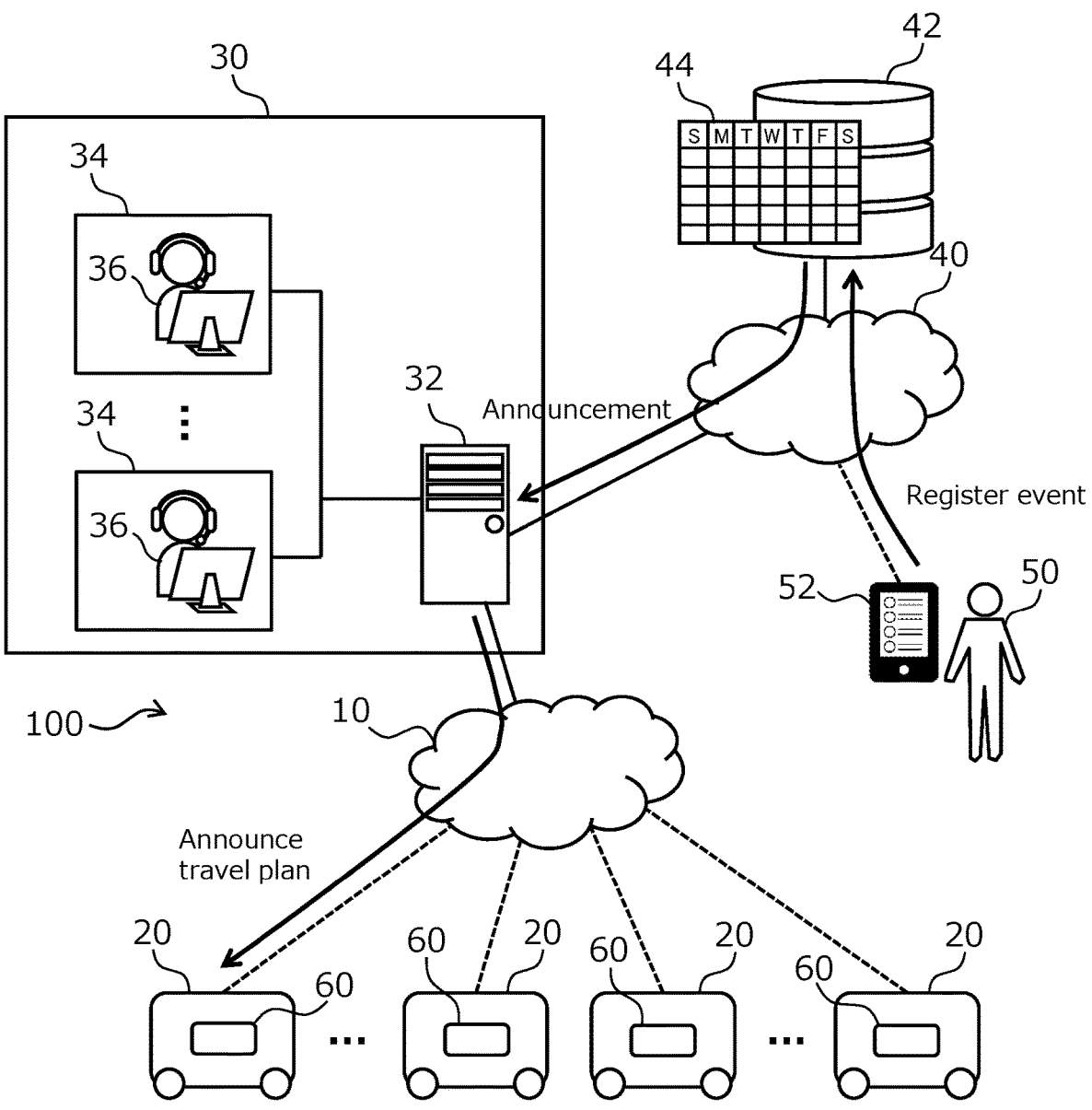
FIG. 1 is a configuration diagram of a delivery system according to an embodiment of the present disclosure.

FIG. 1 is a configuration diagram of a delivery system according to a first embodiment of the present disclosure. A delivery system 100 is a system which delivers an object 60 using a mobile body 20. The mobile body 20 is a small mobile body capable of autonomous travel. The mobile body 20 is configured to include, for example, a chassis with a plurality of wheels and a container for storing the object 60. The object 60, which is delivered by the delivery system 100, is not limited in type as long as it can be physically delivered by the mobile body 20 and is legally permitted. For example, various commodities such as daily goods, foods, liquors, books, electric appliances, dishes, and the like can be delivered as the objects 60. When a container of the mobile body 20 has a heat retaining function, refrigerated/frozen food or a warm dish can also be delivered.

In the delivery system 100, a plurality of the moving bodies 20 are operated. Every mobile body 20 is connected to a management server 32 via a communication network 10 including 4G or 5G. When the delivery system 100 is operated in a limited area, a local 5G may be used as the communication network 10. The management server 32 is installed in a monitoring center 30 where the operational status of the mobile body 20 is monitored. In the monitoring center 30, a plurality of operators 36 are working. The operator 36 monitors the operational status of the mobile body 20 at a monitoring terminal 34 and can also provide remote support for the mobile body 20 by operating the monitoring terminal 34 if necessary.

The delivery system 100 has various uses. One of its uses is to deliver the object 60 to an event. An event of the present description is not limited to any scale or to any contents as long as it is an event which can be a delivery target of the object 60 deliverable by the mobile body 20. A meeting where coffee or a snack is delivered as the object 60 is an example of the event. In addition to food and drink, equipment for the meeting such as a PC, a recorder, a projector, and the like can be delivered as the object 60. A party is also included in the event to which the object 60 is delivered by the delivery system 100 because a present and a dish is expected to be delivered to it. Furthermore, an individual meal, such as lunch or dinner, is also included in the event to which the object 60 is delivered by the delivery system 100 because food and a beverage is expected to be delivered by home delivery service.

When a user 50 utilize the delivery system 100 to deliver the object 60 to the event, the user 50 registers an event schedule in an online calendar 44 in a cloud database 42 on the Internet 40. The "Event Schedule" in this description is an information including a date and time of the event, a place where the event is held, what object is to be delivered, and how many objects are delivered. In addition, in case where a time or time zone in an event when the object is desired to be delivered is determined, this information is also included in the schedule. The user 50 can register such information relating to the event schedule in the online calendar 44 using a portable terminal 52 such as a smartphone. Also, the user 50 can change the schedule once registered in the online calendar 44 via the portable terminal 52. Incidentally, the cloud database 42 and the online calendar 44 may be managed by a company running the delivery system 100 or may be managed by another company.

The management server 32 is linked to the online calendar 44. When the event is registered in the online calendar 44, the information relating to its schedule is automatically announced to the management server 32. However, the event for which the schedule is announced to the management server 32 is limited to a schedule for an event (target event) to which the object is to be delivered. The user 50 have the choice of determining whether to set an event as a target event to which the object is to be delivered. For example, a reservation site for the object delivery linked to the online calendar 44 may allow the user 50 to determine the target event.

In case where the event registered in the online calendar 44 is a target event, when its schedule is changed, information about the changed schedule is automatically announced to the management server 32. The schedule change to be announced includes cancellation of the event, that is, deleting the event from the online calendar 44. The management server 32 is configured to create a delivery plan of the object 60 based on the schedule for the event acquired from the online calendar 44. In the delivery plan, what time, what is delivered, and from where to where is planned.

The management server 32 is configured to create a travel plan for the mobile body 20 based on the delivery plan. In the travel plan, a departure place, a destination, arrival time, and a travel route are planned for example. The departure place is where the object 60 is received. The destination is where the object 60 is delivered, that is, where the event is held. The arrival time is time when the event is held or a specific time or time zone within the event. The management server 32 is configured to notify the mobile body 20 of the created travel plan. The mobile body 20 is configured to autonomously travel according to the announced travel plan and deliver the object 60 to the destination.

Figure 2:
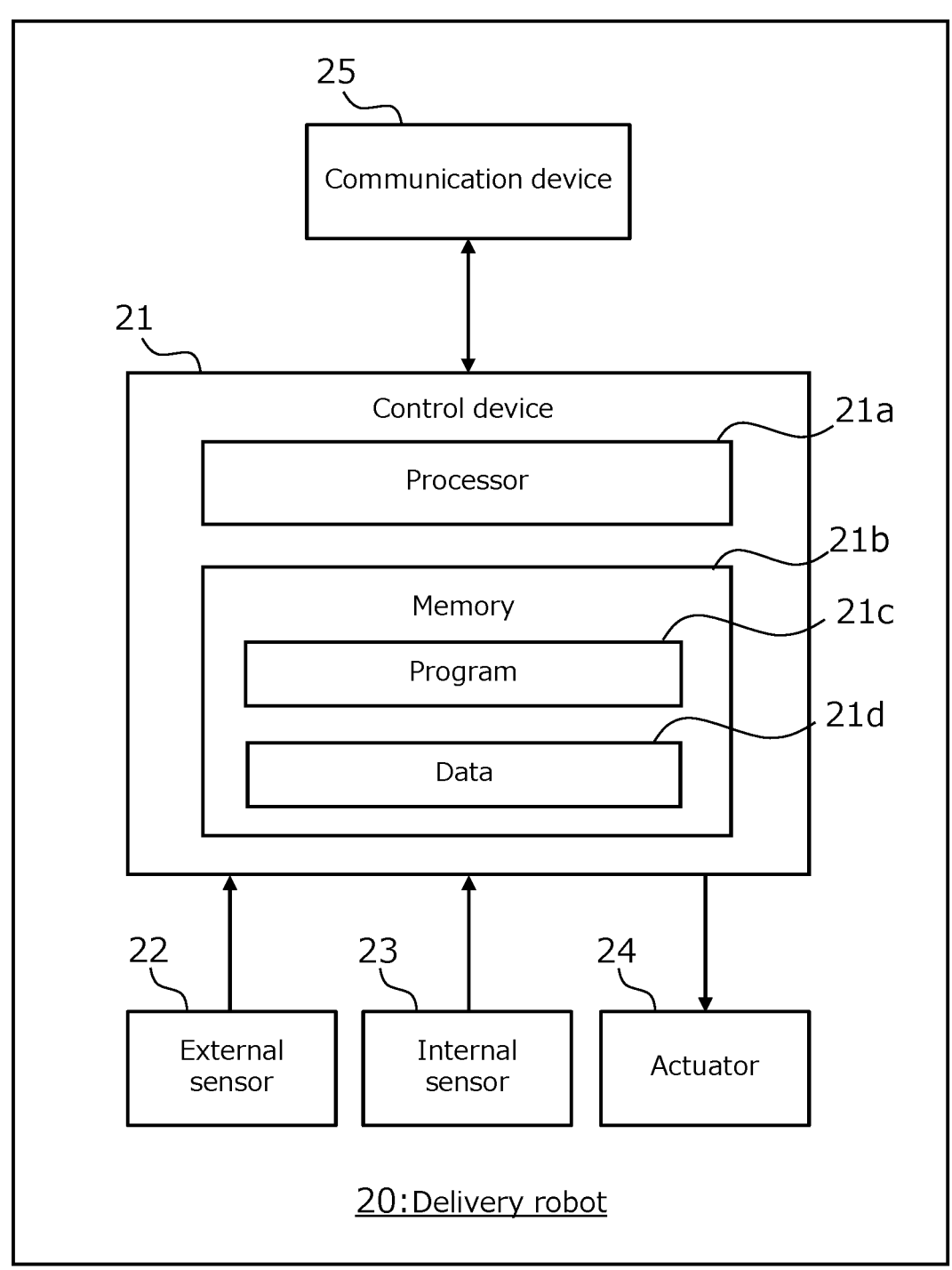
FIG. 2 is a block diagram showing an example of a configuration of a delivery robot.

FIG. 2 is a block diagram illustrating an example of a configuration of the mobile body 20. The mobile body 20 includes a control device 21. The control device 21 is a computer, and more particularly, an assembly of a plurality of ECUs (Electronic Control Unit) mounted on the mobile body 20. The mobile body 20 also includes an external sensor 22, an inner sensor 23, an actuator 24, and a communication device 25. These are connected to the control device 21.

The control device 21 includes at least one processor $21a$ (hereinafter simply referred to as the processor $21a$) and at least one memory $21b$ (hereinafter simply referred to as the memory $21b$) coupled with the processor $21a$. The memory $21b$ stores at least one program $21c$ (hereinafter, simply referred to as the program $21c$) executable by the processor $21a$ and various data $21d$ related to them.

The program $21c$ is executed by the processor $21a$, thereby realizing various processes by the processor $21a$. The program $21c$ includes, for example, a program for making the mobile body 20 autonomously travel based on the travel plan. The data $21d$ includes, for example, map data used for autonomous travel. The memory $21b$ includes a main storage device and an auxiliary storage device. The program $21c$ may be stored in the main storage device or may be stored in a computer-readable storage medium which is the auxiliary storage device.

The external sensor 22 includes a recognition sensor which acquires information for recognizing the surrounding conditions of the mobile body 20. The recognition sensor includes a camera which captures an image around the mobile body 20, particularly in front of the mobile body 20. A LiDAR (Laser Imaging Detection and Ranging) and a millimeter-wave radar are exemplified as recognition sensors other than a camera. The external sensor 22 includes a position sensor for detecting the position and the direction of the mobile body 20. As the position sensor, a GPS (Global Positioning System) sensor is exemplified. The information acquired by the external sensor 22 is transmitted to the control device 21.

The internal sensor 23 includes a status sensor that acquires information about the motion of the mobile body 20. Examples of the status sensor include a wheel speed sensor, an acceleration sensor, an angular velocity sensor, and a steering angle sensor. The acceleration sensor and the angular velocity sensor may be IMUs. The information acquired by the internal sensor 23 is transmitted to the control device 21. The information acquired by the internal sensor 23 and the information acquired by the external sensor 22 are used as information for autonomous travel.

The actuator 24 includes a steering device for steering the mobile body 20, a driving device for driving the mobile body 20, and a braking device for braking the mobile body 20. The actuator 24 may be, for example, an electric motor installed in each wheel. In this case, by independently controlling the rotation of each wheel of the mobile body 20, steering, driving, and braking the mobile body 20 is enabled. That is, the electric motor as the actuator 24 may function as the steering device, the driving device, and the braking device. The actuator 24 is operated by a control signal transmitted from the control device 21.

The communication device 25 is a device for controlling a radio communication with the outside of the mobile body 20. The communication device 25 communicates with the management server 32 via a communication network 10. The information processed by the control device 21 is transmitted to the management server 32 using the communication device 25. The information transmitted to the management server 32 includes monitoring information for monitoring the operational status of the mobile body 20. The monitoring information includes, in addition to the information acquired by the external sensor 22 and the internal sensor 23, information (e.g., target trajectory) obtained by calculation using the autonomous travel program. The information processed by the management server 32 is taken into the control device 21 using the communication device 25. Moreover, when a vehicle-to-vehicle communication with another delivery robot or a road-to-vehicle communication with an infrastructure facility is required, communication with those outside devices is also carried out by the communication device 25.

Figure 3:
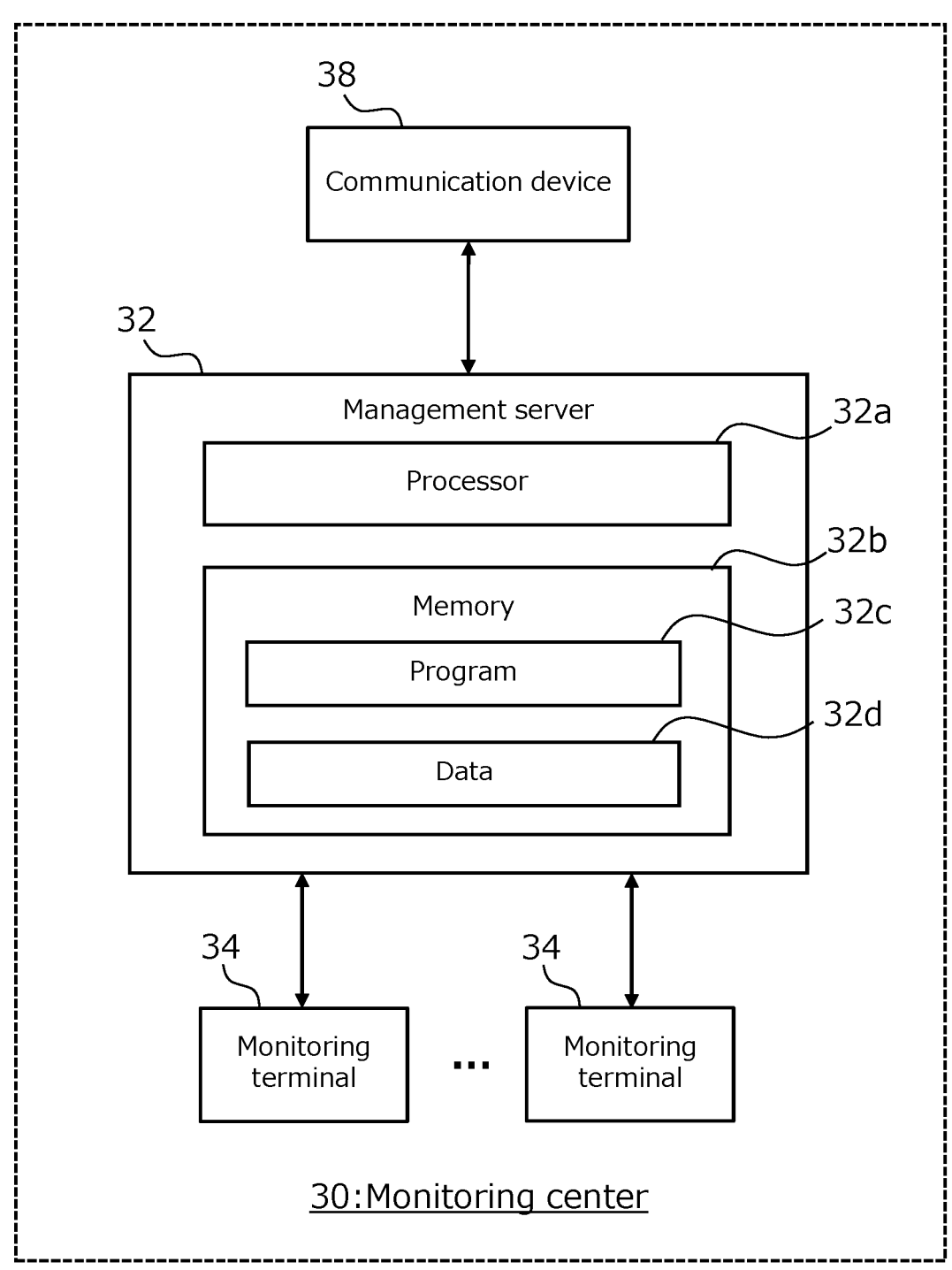
FIG. 3 is a block diagram showing an example of a configuration of a management server.

FIG. 3 is a block diagram illustrating an example of a configuration of the management server 32. The management server 32 is installed in the monitoring center 30 together with the monitoring terminal 34 and a communication device 38. The communication device 38 is a device for controlling communication with the outside of the monitoring center 30. The communication device 38 mediates communication between the management server 32 and a plurality of the moving bodies 20. In addition, the communication device 38 automatically acquires the event schedule announced by the online calendar 44 linked to it. The information processed by the management server 32 is transmitted to the mobile body 20 using the communication device 38. The information processed by the mobile body 20 is taken into the management server 32 using the communication device 38.

The management server 32 is a single computer or an aggregate of a plurality of computers connected through a communication network. The management server 32 includes at least one processor 32a (hereinafter simply referred to as the processor 32a) and at least one memory 32b (hereinafter simply referred to as the memory 32b) coupled with the processor 32a. The memory 32b stores at least one program 32c (hereinafter, simply referred to as the program 32c) executable by the processor 32a and various data 32d relating to them.

The program 32c is executed by the processor 32a, thereby realizing various processes by the processor 32a. The program 32c includes a delivery plan program for creating the delivery plan based on the event schedule, and a travel plan program for creating the travel plan for the mobile body 20 based on the delivery plan. In addition, the program 32c includes a delivery plan modification program for modifying the delivery plan when the change in the event schedule is announced. The data 32d includes information for creating the delivery plan and the travel plan, for example, various kinds of information such as inventory information in a shop or a warehouse, waiting time for the object which is the delivery target to be prepared, map information, operational information of the mobile body 20, and the like. The memory 32b includes a main storage device and an auxiliary storage device. The program 32c may be stored in a main storage device or may be stored in a computer-readable storage medium which is an auxiliary storage device.

The monitoring terminal 34 includes a display. The display can display the operational status of all moving bodies 20 or can display the operational status of a particular mobile body 20. In addition, the display can also display an image captured by a camera of a particular mobile body 20.

Further, the monitoring terminal 34 also includes an input device for the operator 36's remote support of the mobile body 20. Specific examples of the input device include a button, a lever, and a touch panel.

2. Operation of Object Delivery by Delivery System

Next, the operation of the object delivery by the delivery system 100 is described with reference to FIG. 4. The delivery system 100 is a system which delivers the object 60 using the mobile body 20 toward the event (the target event, to which the object is delivered) registered in the online calendar 44 by the user 50. In the example shown in FIG. 4, a building 70 with meeting rooms 74 and 76 is exemplified. In the online calendar 44, a meeting held in the meeting room 74 is registered as the event by the user 50.

In the schedule for the meeting registered in the online calendar 44, the meeting room 74 in the building 70, which is the meeting place, the meeting time, and the number of participants in the meeting are registered. In case where the event is a meeting, the number of cups corresponding to the number of participants in the meeting and the pot containing the amount of coffee corresponding to the number of participants are automatically determined as the object 60 to be delivered by the delivery plan program executed by the management server 32. However, when delivering coffee is not required, the user 50 can specify the fact at the time of registration of the meeting in the online calendar 44. Furthermore, the user 50 can also designate another drink, such as black tea, as the object 60 instead of coffee, and can also designate a snack, such as a sandwich, as the object 60 in addition to the beverage.

The management server 32 creates the delivery plan to deliver coffee to the meeting room 74. The delivery plan includes a coffee shop 80 where the mobile body 20 receives a pot of coffee and cups. The management server 32 creates the travel plan for the mobile body 20 based on the delivery plan and notifies the mobile body 20 of the travel plan. The travel plan includes a travel route R1 to depart from the coffee shop 80 and arrive at the meeting room 74 at the time when the meeting is held. Incidentally, the travel route R1 is a basic route from the coffee shop 80 to the building 70, which is designated in advance. The mobile body 20 delivers the object 60 to the meeting room 74 by autonomous travel along the travel route R1. The object 60 may be loaded into the mobile body 20 at the coffee shop 80 by either the mobile body 20 itself using a robot arm or a clerk of the coffee shop 80.

Here, it is supposed that the meeting place is changed from the meeting room 74 to another meeting room 76. In response to this change, the user 50 changes the meeting schedule registered in the online calendar 44. When the content registered in the online calendar 44 is changed, the changed schedule is automatically announced from the online calendar 44 to the management server 32. Upon receiving the announcement of the change in the meeting schedule, the management server 32 executes the delivery plan modification program.

In case where the management server 32 acquires the changed schedule before the object 60 starts being delivered, the management server 32 re-creates the delivery plan based on the changed schedule. Then, the management server 32 notifies the mobile body 20 of the travel plan created based on the re-created delivery plan. In the travel plan announced to the mobile body 20, the travel route R1, which is the basic route, is designated as a travel route to deliver the object 60 from the coffee shop 80 to the meeting room 76. The mobile body 20 delivers the object 60 to the meeting room 76 by autonomous travel along the travel route R1.

However, there is a case where, depending on the timing at which the user changes the content registered in the online calendar 44, the management server 32 is notified of the changed schedule while the object 60 is being delivered by the mobile body 20. In this case, the management server 32 temporarily stops the mobile body 20 in the middle of delivery and modifies the delivery plan based on the changed scheduled and the current position of the mobile body 20.

Figure 4:
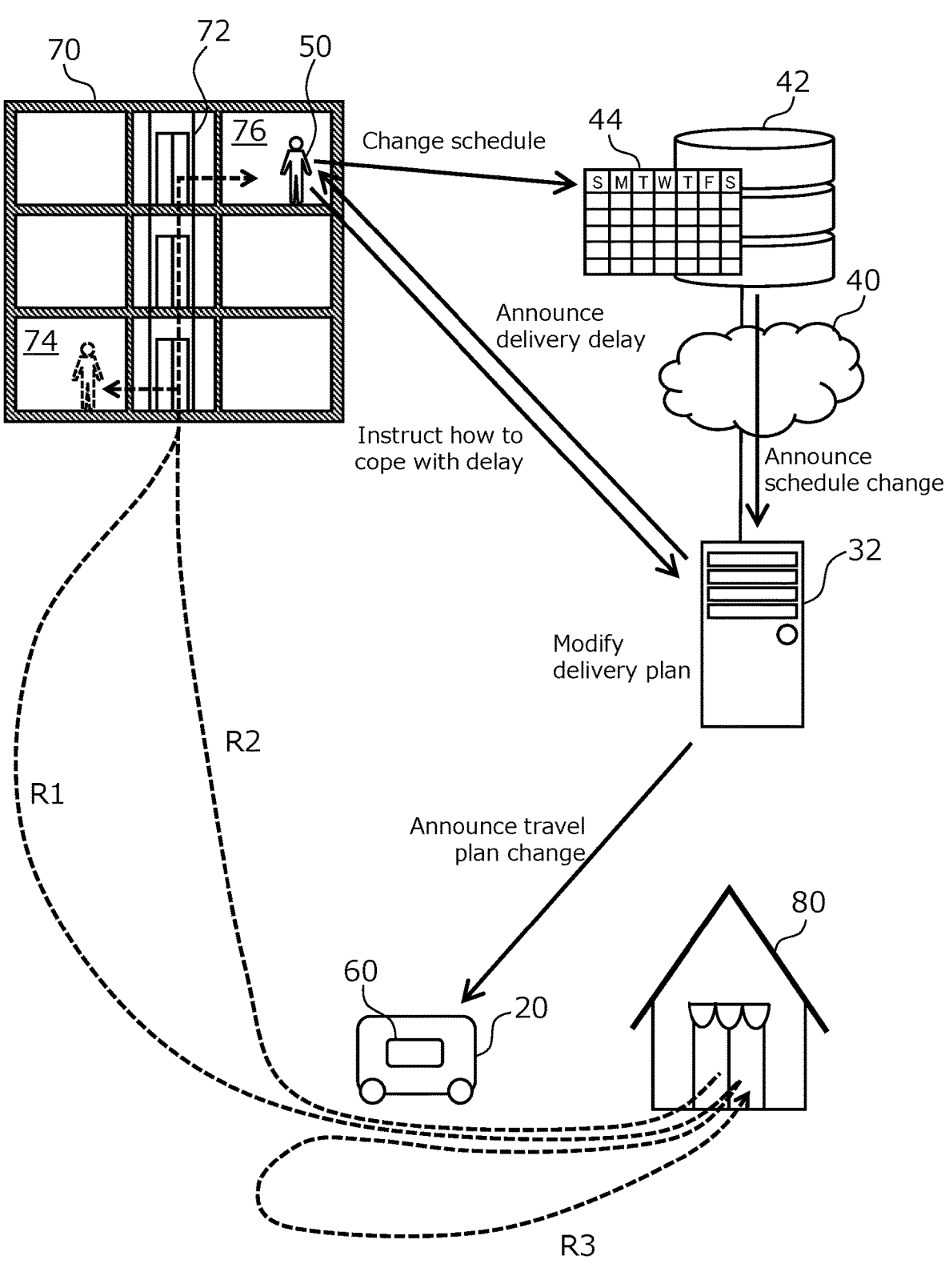
FIG. 4 is a diagram explaining an operation of a delivery of an object by a delivery system according to an embodiment of the present disclosure.

In the example shown in FIG. 4, the meeting place is changed from the meeting room 74 on the first floor to the meeting room 76 on the third floor in the building 70. In this case, since the elevator 72 is included in the travel route in the building 70, it is predicted that the arrival time is delayed by the waiting time for the elevator 72. Based on this prediction, the management server 32 searches the map information for a route which can reach the building 70 earlier than the travel route R1. When a travel route R2 is found as a result of the search, the management server 32 modifies the delivery plan so that the object 60 is delivered to the meeting room 76 through the travel route R2.

The management server 32 calculates whether the object 60 can be delivered in time for the meeting in the meeting room 76 according to the modified delivery plan. When a positive result is obtained by the calculation, the management server 32 creates the travel plan from the current position of the mobile body 20 based on the modified delivery plan. Then, it notifies the mobile body 20 of the newly created travel plan. The mobile body 20 travels along the travel route R2 to the building 70 according to the announced travel plan and travels to the meeting room 76 using the elevator 72.

On the other hand, in case where the object 60 cannot be delivered in time for the meeting in the meeting room 76 even when the travel route R2 is selected, the management server 32 notifies the user 50 that the object 60 cannot be delivered in time for the meeting. The notification from the management server 32 is issued to the portable terminal 52 belonging to the user 50. In case where the object 60 cannot be delivered in time for the changed meeting schedule, the object 60 is not delivered as it is, but the user 50 is notified and asked for an instruction, so that it is possible to prevent the object 60, which becomes no longer useful, from being delivered. The management server 32 modifies the delivery plan again upon receiving the user 50's instruction to the notification.

For example, when the user 50 cancels the delivery of the object 60, the management server 32 modifies the delivery plan again to return the mobile body 20 to the coffee shop 80, which is the delivery source. Then, it creates a travel plan including a travel route R3 from the current position to the coffee shop 80 based on the re-modified delivery plan and notifies the mobile body 20 of the newly created travel plan. The mobile body 20 returns to the coffee shop 80 along the travel route R3 according to the announced travel plan. Incidentally, in case where the delivery is delayed due to the change in the schedule by the user 50, even when the delivery of the object 60 is canceled, the coffee fee and the delivery fee are not returned to the user 50.

It is also expected that the user 50 instructs the object 60 to be delivered as it is in response to the notification that the object 60 cannot be delivered in time for the meeting. In this case, the management server 32 modifies the delivery plan again so as to travel to the building 70 through the travel route R1, which is the basic route, and notifies the mobile body 20 of the travel plan created based on the re-modified delivery plan.

In the above example, the case where the meeting place is changed is described, but a change in the meeting schedule is not limited to the meeting place. There is a case where the meeting time or the number of participants in the meeting is changed. When a change in the meeting schedule is a change of the meeting time, there is a case where the meeting time is delayed or advanced. When the meeting time is delayed, the management server 32 calculates whether the mobile body 20 has time to return to the coffee shop 80, which is the delivery source. When it doesn't have enough time, the management server 32 modifies the delivery plan to make the mobile body 20 keep waiting somewhere safe until the meeting time.

When the mobile body 20 has time to return to the coffee shop 80, which is the delivery source, the management server 32 modifies the delivery plan to make the mobile body 20 temporarily return to the coffee shop 80. In this case, the coffee can be replaced with a new one, but an extra fee associated with the replacement of the coffee is incurred for the user 50. When the user 50 does not want to pay the extra fee, the management server 32 modifies the delivery plan to make the mobile body 20 keep waiting in a safe location, regardless of how much time is left until the meeting in case where the meeting is delayed.

When the meeting time is advanced, the management server 32 searches a travel route which can arrive earlier to the meeting room from the map information and modifies the delivery plan based on the searched travel route. If the modified delivery plan can be made in time for the meeting, the management server 32 creates a new travel plan for the mobile body 20 based on the modified delivery plan.

On the other hand, if it cannot be made in time for the meeting with the modified delivery plan, the management server 32 notifies the user 50 that the delivery cannot be made in time for the meeting. When the user 50 cancels the delivery of the object 60 in response to this notification, the management server 32 modifies the delivery plan again to return the mobile body 20 to the coffee shop 80, which is the delivery source. In this case, the coffee fee and the delivery fee associated with the cancellation are borne by the user 50.

When a change in the meeting schedule is a change in the number of participants in the meeting, there are cases where the number of participants decreases and increases. When the number of participants decreases, some of the cups turn into surplus, but it is not a problem. Thus, in this case, the management server 32 makes the mobile body 20 to deliver the object 60 as it is without modifying the delivery plan.

When the number of participants in the meeting increases due to a change in the meeting schedule, the management server 32 judges whether the number of cups currently delivered by the mobile body 20 is sufficient. When the number of cups is insufficient with respect to the number of participants even considering the spare cups possessed by the mobile body 20, the management server 32 modifies the delivery plan to return to the coffee shop 80 to pick up the cups to supply the shortage. If the modified delivery plan can be made in time for the meeting, the management server 32 creates a new travel plan for the mobile body 20 based on the modified delivery plan.

On the other hand, in case where the modified delivery plan cannot be made in time for the meeting, the management server 32 notifies the user 50 that the delivery cannot be made in time for the meeting if returning to pick up cups to supply the shortage. When the user 50 permits the delay in the delivery to the meeting in response to this notification, the management server 32 creates the travel plan according to the modified delivery plan and makes the mobile body 20 return to pick up cups to supply the shortage. When the user 50 does not permit the delay in the delivery, the management server 32 makes the mobile body 20 continue delivering the object 60 as it is according to the original delivery plan. Incidentally, if there is a vacant mobile body 20, cups to supply the shortage may be delivered by another mobile body 20.

3. Processes Among the User, the Online Calendar, the Management Server, and the Delivery Robot by the Delivery System The operation of the object delivery by the delivery system 100 described above can be illustrated by the sequencing diagram shown in FIG. 5. This sequencing diagram illustrates an example of a flow of processes among the user 50, the online calendar 44, the management server 32, and the mobile body 20 by the delivery system 100. This sequence diagram also illustrates a delivery method according to the present embodiment.

Figure 5:
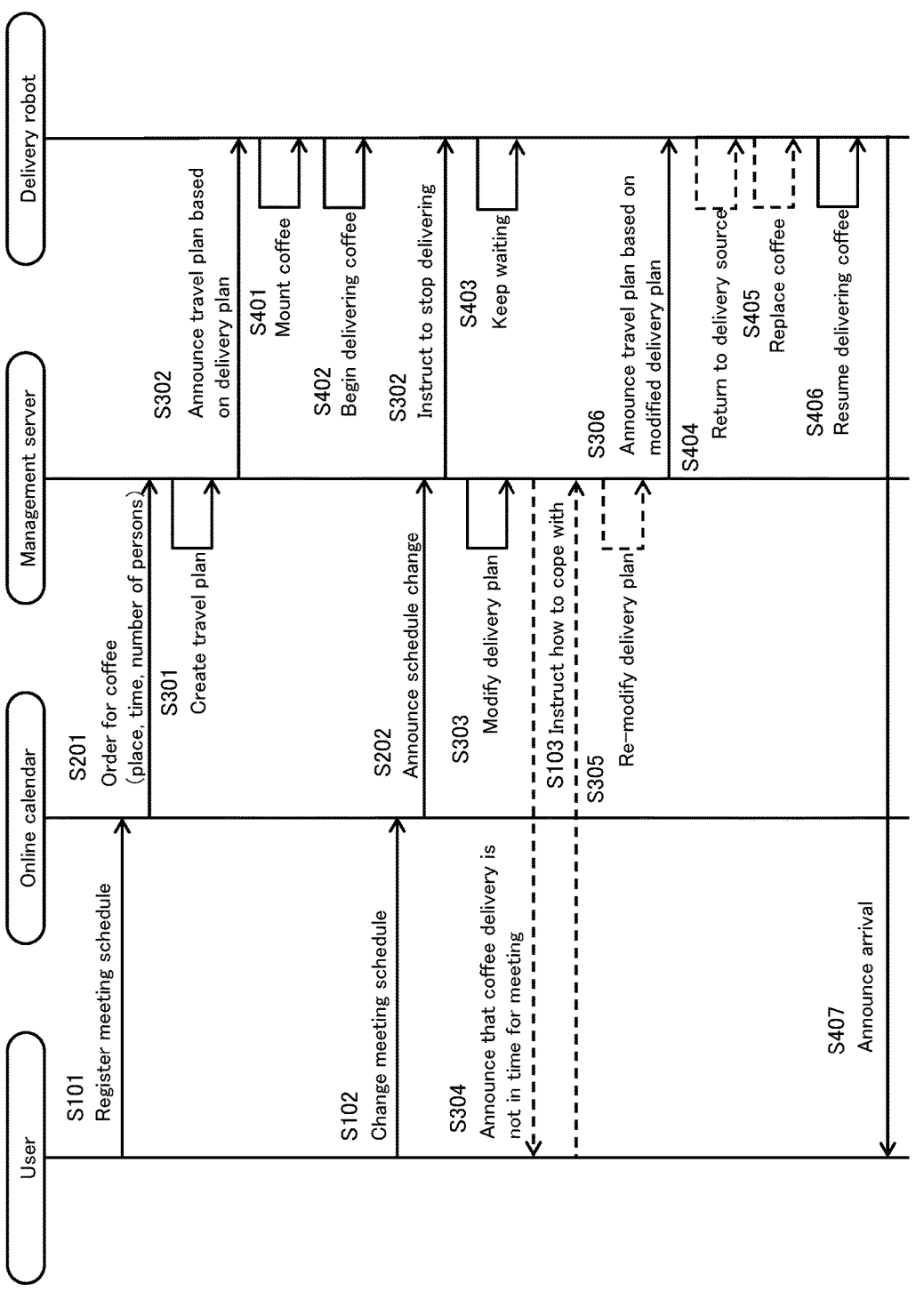
FIG. 5 is a sequence diagram showing an example of a flow of processes among a user, an online calendar, a management server, and a delivery robot in a delivery system according to an embodiment of the present disclosure.

In the example shown in FIG. 5, first, the meeting schedule is registered in the online calendar 44 by the user 50 (step S101). When the meeting schedule is registered, an order for coffee is automatically given the management server 32 by the online calendar 44 (step S201). The order for coffee includes time, place, and number of persons.

The management server 32 creates the delivery plan to deliver coffee as ordered (step S301). Next, the management server 32 creates the travel plan for the mobile body 20 based on the created delivery plan and notifies the mobile body 20 of the created travel plan (step S302).

The mobile body 20 notified of the travel plan first mounts a pot of coffee and cups corresponding to the number of people at the coffee shop 80, which is the delivery source (step S401). After completing the mounting, the mobile body 20 begins delivering coffee, which is the object 60, according to the travel plan (step S402).

Next, the meeting schedule registered in the online calendar 44 is changed by the user 50 (step S102). When the meeting schedule is changed, the online calendar 44 notifies the management server 32 of the change in the schedule (step S202).

The management server 32 instructs the mobile body 20 to stop delivery upon receiving the notification of the schedule change (step S302). Then, it modifies the delivery plan based on the changed schedule (step S303). The mobile body 20 instructed to stop delivering keeps waiting until the instruction is given again (step S403)

When it is predicted that the coffee cannot be delivered in time for the meeting as a result of the modification of the delivery plan, the management server 32 notifies the user 50 of the fact (step S304). The user 50 instructs how to cope with it in response to the notification from the management server 32 (step S103). The management server 32 modifies the delivery plan again in response to the instruction from the user 50 (step S305)

The management server 32 creates a new travel plan based on the delivery plan modified at the step S303 or the delivery plan re-modified at the step S305 and notifies the mobile body 20 of the created travel plan (step S306). The mobile body 20 returns to the coffee shop 80, which is the delivery source (step S404), and replaces the coffee to be delivered with new coffee (step S405) depending on the modified delivery plan.

The mobile body 20 resumes delivering coffee according to the travel plan of which it is newly notified (step S406). Then, when it arrives at the meeting room, which is the destination, the mobile body 20 notifies the use 50 of the arrival (step S407). Incidentally, this arrival notification may be given by the management server 32.

As is also apparent from the above sequence diagram, according to the delivery system 100, even when the schedule for the meeting is changed after the mobile body 20 has started delivering the object 60, the object 60 can be delivered in accordance with the changed schedule. In addition, when the schedule for the meeting is changed, the delivery plan is automatically modified accordingly, so that there is an advantage that the user 50 does not need to announce the change in the delivery destination or delivery time.

Figure 6:
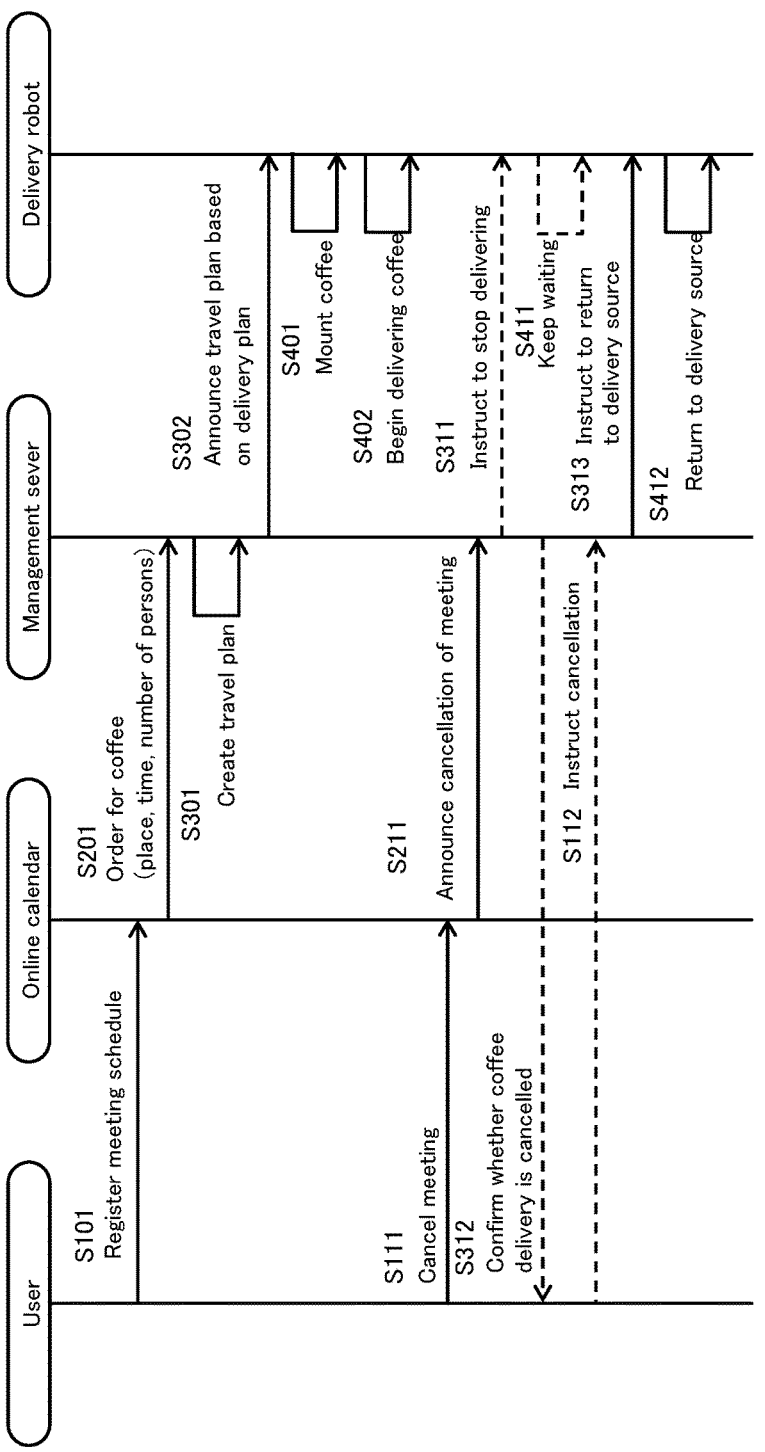
FIG. 6 is a sequence diagram showing another example of a flow of processes among a user, an online calendar, a management server, and a delivery robot in a delivery system according to an embodiment of the present disclosure.

Although not described in the description of the operation of the object delivery with reference to FIG. 4, there is a case where the meeting, which is the event, is cancelled following the user 50's own convenience, the user 50 who is the organizer. The sequence diagram of FIG. 6 illustrates an example of a flow of processes among the user 50, the online calendar 44, the management server 32, and the mobile body 20 by the delivery system 100 in case where the meeting is canceled. In the sequence diagram of FIG. 6, processes common to those in the sequence diagram of FIG. 5 have common step numbers.

In the example shown in FIG. 6, after the delivery of coffee is begun, the meeting schedule registered in the online calendar 44 is canceled by the user 50 (step S111). When the meeting schedule is cancelled, the online calendar 44 notifies the management server 32 of the cancellation of the meeting (step S211).

Upon receiving the notification of the cancellation of the meeting, the management server 32 instructs the mobile body 20 to return to the coffee shop 80, which is the delivery source (step S313). The mobile body 20 receiving the return instruction, stops delivering and returns to the coffee shop 80 (step S412). When the meeting is cancelled, the delivery of the object 60 is also cancelled so that it is possible to prevent an unnecessary object 60 from being delivered.

Incidentally, process executed by the delivery system 100 in case where the meeting is canceled includes a following variation. As a variation, after receiving the notification of cancellation of the meeting from the online calendar 44, the management server 32 instructs the mobile body 20 to stop delivering instead of immediately going back (step S311). The mobile body 20 instructed to stop delivering keeps waiting until the instruction is given again (step S411).

While the mobile body 20 keeps waiting, the management server 32 confirms whether the user 50 cancels the coffee delivery (step S312). There is a case where the user 50 wants to drink the ordered coffee, even when he/she cancels the meeting. In this case, the management server 32 instructs the mobile body 20 to deliver the object 60 as it is. If coffee is no longer necessary due to the cancellation of the meeting, the user 50 instructs the cancellation in response to the confirmation of the cancellation from the management server 32 (step S112). Upon receiving the user 50's instruction to cancel the delivery, the management server 32 instructs the mobile body 20 to return to the coffee shop 80 (step S313). The mobile body 20 keeping waiting returns to the coffee shop 80 upon receiving the instruction to return (step 412).

3. Other Embodiments

In the above-described embodiment, the meeting is exemplified as an example of the event, but here, an individual meal such as lunch is described. In a case where the event is the individual meal, the object 60 delivered by the mobile body 20 is a home delivery such as a hamburger, a pizza, ramen, and the like. As the change int the event schedule, a change in a place for the meal or a change in time for the meal are exemplified. The change in the place for the meal includes a change from the user's home to his/her friend's home. Then, as a response to the change in the schedule, for example, the following can be considered.

When the schedule change is a change in the meal place, the management server 32 modifies the delivery plan for the mobile body 20 and delivers the meal to the changed meal place. If the delivery cannot be made in time for the mealtime as a result of the change in the meal place, the management server 32 notifies the user 50 that the delivery is delayed. When the user 50 cancels the delivery in response to the notification, the management server 32 makes the mobile body 20 to return to the delivery source.

When the schedule change is a change in the mealtime, different actions are taken between in a case where the mealtime becomes earlier and the mealtime becomes later. When the mealtime becomes earlier, the management server 32 makes the mobile body 20 deliver the object 60 to the user 50's meal place as it is. When the delivery cannot be made in time for the mealtime, the management server 32 notifies the user 50 that the delivery is delayed. When the user 50 cancels the delivery in response to the notification, the delivery robot it made to return to the delivery source.

When the mealtime becomes later, the management server 32 calculates whether the mobile body 20 has time to return to the delivery source. When the mobile body 20 has time to return to the delivery source, the management server 32 returns the mobile body 20 to the delivery source. By returning the mobile body 20 to the delivery source, a cold food can be replaced with warm one for example. However, an extra fee is charged to the user 50 in this case. When the mobile body 20 doesn't have enough time to return to the delivery source, the management server 32 makes the mobile body 20 deliver the object 60 as it is. However, it is preferable to notify the user 50 and confirm, prior to delivering the object 60, whether it is acceptable to deliver the object 60.

Another example of the event is a party. In the party, a present may be delivered according to the timetable, or a dish and a dessert are served, but the timetable may be changed depending on the state of progress. Even in such a case, according to the delivery system 100, it is possible to flexibly respond without bothering the user.

Incidentally, in the above-described embodiments, the event schedule is registered in the online calendar 44 of the cloud database 42, but it may be registered in the online calendar on the database stored in the management server 32.

In the above-described embodiments, the delivery system 100 is configured as a centrally managed system in which the delivery plan is created in the management server 32 and the mobile body 20 delivers the object 60 accordingly. However, the delivery system of the present disclosure may be a distributed system in which the management server assigns a delivery robot in response to the order for the object delivery, and the delivery robot creates and modifies the delivery plan.

What is claimed is:

1. A delivery system configured to include a mobile body for delivering an object by autonomous travel and a management server connected with the mobile body by a communication network, the delivery system comprising:

at least one memory storing at least one program; and at least one processor coupled with the at least one memory, wherein the at least one program is configured to cause the at least one processor to execute:

acquiring a schedule including information about a date and time of a target event, a place where the target event is held, what object is to be delivered, and how many objects are delivered from an online calendar in a database in which a user registered the schedule of the target event, the target event being held at a designated delivery destination to which the object is delivered, the designated delivery destination being a particular non-mobile physical location that is set in the calendar in advance;

creating a delivery plan of the object to the target event by the mobile body based on the schedule of the target event;

moving the mobile body according to the delivery plan;

receiving a notification of a change in the schedule of the target event registered in the online calendar;

during a delivery of the object from a source to the target event, modifying the delivery plan in response to the change in the schedule of the target event, based on the change of the schedule registered in the online calendar, and a current position of the mobile body;

when the change relates to the date and the time of the target event, determining whether the change in the schedule is a delayed time in which the time of the target event after being changed is delayed compared with the time of the target event before being changed or the change in the schedule is an earlier time in which the time of the target event after being changed is earlier than the time of the target event before being changed;

when the change in the schedule is a delayed time to the designated delivery destination, modifying the delivery based on whether the mobile body has time to return to the source, the delivery destination being the same non-mobile physical location that was set in the calendar in advance;

when the change in the schedule is a delayed time to the designated delivery destination and the mobile body has time to return to the source, modifying the delivery plan to make the mobile body return to the source, the delivery destination being the same non-mobile that was advance;

when the change in the schedule is an earlier time to the designated delivery destination, modifying the delivery based on whether a travel route exists to the designated delivery destination that will allow the mobile body to arrive to the designated delivery destination by the earlier time, the delivery destination being the same non-mobile physical location that was set in the calendar in advance; and moving the mobile body in accordance with a modified delivery plan.

2. The delivery system according to claim 1, wherein the at least one program is configured to cause the at least one processor to execute modifying the delivery plan to cancel the delivery of the object in response to cancellation of the target event.

3. The delivery system according to claim 1, wherein the at least one program is configured to cause the at least one processor to execute confirming with the user whether to cancel the delivery of the object in response to cancellation of the target event.

4. The delivery system according to claim 1, wherein the at least one program is configured to cause the at least one processor to execute:

issuing a notification to the user in response to a delay in the delivery of the object to the target event; and modifying the delivery plan based on an instruction from the user to the notification.

5. The delivery system according to claim 1, wherein the database is stored in the management server.

6. The delivery system according to claim 1, wherein the database is a cloud database.

7. A delivery method for delivering an object to a designated delivery destination by controlling a behavior of a mobile body by a computer and causing the mobile body to travel autonomously, the delivery method comprising:

acquiring a schedule including information about a date and time of a target event, a place where the target event is held, what object is to be delivered, and how many objects are delivered from an online calendar in a database in which a user registered the schedule of the target event, the target event being held at a designated delivery destination to which the object is delivered, the designated delivery destination being a particular non-mobile physical location that is set in the calendar in advance;

creating a delivery plan of the object to the target event by the mobile body based on the schedule of the target event;

moving the mobile body according to the delivery plan;

receiving a notification of a change in the schedule of the target event registered in the online calendar;

during a delivery of the object from a source to the target event, modifying the delivery plan in response to the change in the schedule of the target event, based on the change of the schedule registered in the online calendar, and a current position of the mobile body;

when the change relates to the date and the time of the target event, determining whether the change in the schedule is a delayed time in which the time of the target event after being changed is delayed compared with the time of the target event before being changed or the change in the schedule is an earlier time in which the time of the target event after being changed is earlier than the time of the target event before being changed;

when the change in the schedule is a delayed time to the designated delivery destination, modifying the delivery based on whether the mobile body has time to return to the source, the delivery destination being the same non-mobile physical location that was set in the calendar in advance;

when the change in the schedule is a delayed time to the designated delivery destination and the mobile body has time to return to the source, modifying the delivery plan to make the mobile body return to the source, the delivery destination being the same non-mobile physical location that was set in the calendar in advance;

when the change in the schedule is an earlier time to the designated delivery destination, modifying the delivery based on whether a travel route exists to the designated delivery destination that will allow the mobile body to arrive to the designated delivery destination by the earlier time, the delivery destination being the same non-mobile physical location that was set in the calendar in advance; and moving the mobile body in accordance with a modified delivery plan.

8. A non-transitory computer-readable storage medium storing a program for causing a computer to control a behavior of a mobile body, the mobile body delivering an object to a designated delivery destination by autonomous travel, the program being configured to cause the computer to execute:

acquiring a schedule including information about a date and time of a target event, a place where the target event is held, what object is to be delivered, and how many objects are delivered from an online calendar in a database in which a user registered the schedule of the target event, the target event being held at a designated delivery destination to which the object is delivered, the designated delivery destination being a particular non-mobile physical location that is set in the calendar in advance;

creating a delivery plan of the object to the target event by the mobile body based on the schedule of the target event;

moving the mobile body according to the delivery plan;

receiving a notification of a change in the schedule of the target event registered in the online calendar;

during a delivery of the object from a source to the target event, modifying the delivery plan in response to the change in the schedule of the target event, based on the change of the schedule registered in the online calendar, and a current position of the mobile body;

when the change relates to the date and the time of the target event, determining whether the change in the schedule is a delayed time in which the time of the target event after being changed is delayed compared with the time of the target event before being changed or the change in the schedule is an earlier time in which the time of the target event after being changed is earlier than the time of the target event before being changed;

when the change in the schedule is a delayed time to the designated delivery destination, modifying the delivery based on whether the mobile body has time to return to the source, the delivery destination being the same non-mobile physical location that was set in the calendar in advance;

when the change in the schedule is a delayed time to the designated delivery destination and the mobile body has time to return to the source, modifying the delivery plan to make the mobile body return to the source, the delivery destination being the same non-mobile physical location that was set in the calendar in advance;

when the change in the schedule is an earlier time to the designated delivery destination, modifying the delivery based on whether a travel route exists to the designated delivery destination that will allow the mobile body to arrive to the designated delivery destination by the earlier time, the delivery destination being the same non-mobile physical location that was set in the calendar in advance; and moving the mobile body in accordance with a modified delivery plan.

* * * * *